United States Patent [19]

Bankroff

[11] Patent Number: 5,294,028
[45] Date of Patent: Mar. 15, 1994

[54] CONTAINER TRANSPORT ASSEMBLY

[76] Inventor: Barry P. Bankroff, 520 E. 9th St. Apt 1B, Lockport, Ill. 60441

[21] Appl. No.: 31,706

[22] Filed: Mar. 15, 1993

[51] Int. Cl.⁵ ............................ A45F 5/00; B62J 11/00
[52] U.S. Cl. .................................... 224/148; 224/151; 224/226; 224/253; 224/32 R; 224/34; 224/35; 220/669
[58] Field of Search ................ 224/148, 151, 202, 205, 224/226, 227, 251, 253, 30 R, 32 R, 34, 35, 39, 40; 220/669, 675, 914; D9/537, 538, 500, 539; D7/510, 511; 294/31.2

[56] References Cited

U.S. PATENT DOCUMENTS

| | | | |
|---|---|---|---|
| D. 228,176 | 8/1973 | Plummer | D9/538 |
| D. 230,256 | 2/1974 | Ckola | D9/538 |
| 674,787 | 5/1901 | Metz | 294/31.2 |
| 3,820,695 | 6/1974 | Pecjak | 224/148 |
| 4,401,245 | 8/1983 | Zills | 224/148 |
| 5,056,696 | 10/1991 | Lahr | 224/253 X |
| 5,147,079 | 9/1992 | Heather | 224/205 X |
| 5,156,275 | 10/1992 | Murray | 206/581 |

OTHER PUBLICATIONS

Bike Nashbar Catalog #58, Christmas '88 p. 41.

*Primary Examiner*—Glenn T. Barrett
*Attorney, Agent, or Firm*—Leon Gilden

[57] ABSTRACT

First and second cylindrical housings coaxially aligned relative to one another are pivotally secured together by associated strap portions to receive a bottle therethrough, wherein the bottle structure is arranged for receiving a support strap therethrough.

4 Claims, 4 Drawing Sheets

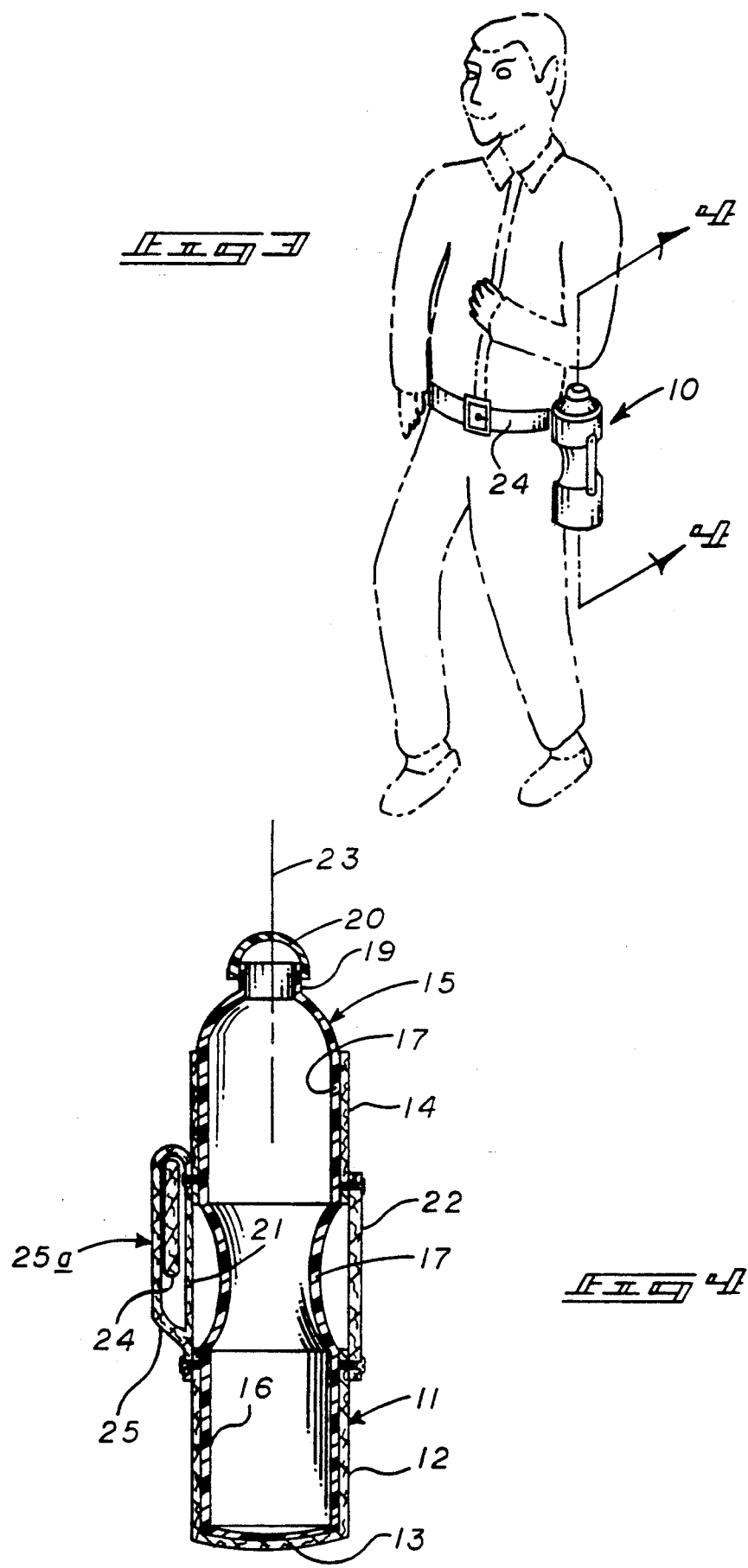

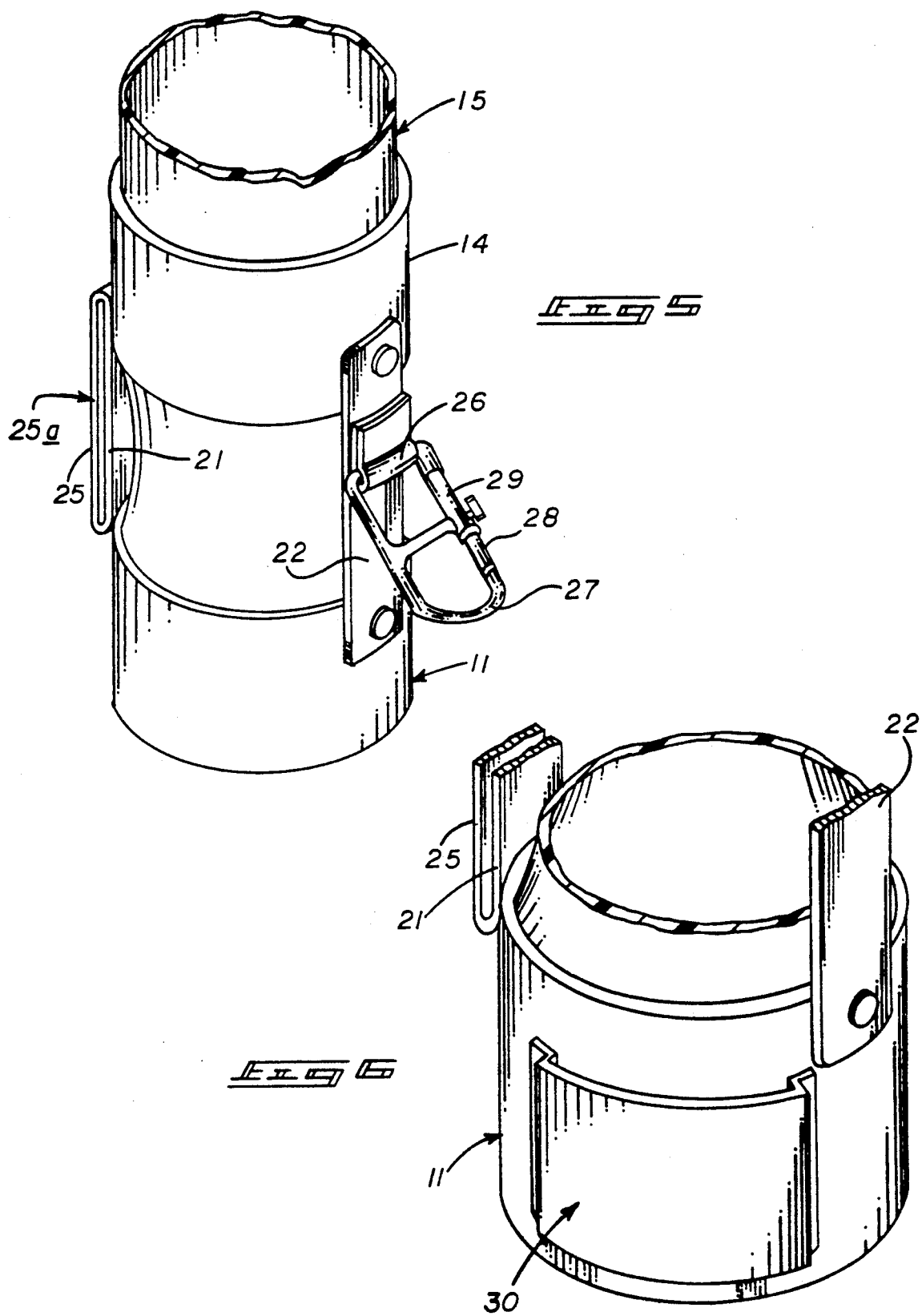

CONTAINER TRANSPORT ASSEMBLY

BACKGROUND OF THE INVENTION

1. Field of the Invention

The field of invention relates to container support structure, and more particularly pertains to a new and improved container transport assembly wherein the same is arranged for the ease of transport and securement of a container within the organization.

2. Description of the Prior Art

Container transport structure to secure a container is set forth in the prior art indicated by the U.S. Pat. No. 4,955,572 having a cylindrical housing with an end cap removable therefrom to receive a fluid therewithin.

The instant invention attempts to overcome deficiencies of the prior art by providing for a flexible aligned plurality of cylindrical housing structures arranged for ease of accommodation of a container and in this respect, the present invention substantially fulfills this need.

SUMMARY OF THE INVENTION

In view of the foregoing disadvantages inherent in the known types of container support structure now present in the prior art, the present invention provides a container transport assembly wherein the same is arranged for the mounting of a container for ease of transport and manipulation of the container in use. As such, the general purpose of the present invention, which will be described subsequently in greater detail, is to provide a new and improved container transport assembly which has all the advantages of the prior art container transport apparatus and none of the disadvantages.

To attain this, the present invention provides first and second cylindrical housings coaxially aligned relative to one another pivotally secured together by associated strap portions to receive a bottle therethrough, wherein the bottle structure is arranged for receiving a support strap therethrough.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved container transport assembly which has all the advantages of the prior art container transport apparatus and none of the disadvantages.

It is another object of the present invention to provide a new and improved container transport assembly which may be easily and efficiently manufactured and marketed.

It is a further object of the present invention to provide a new and improved container transport assembly which is of a durable and reliable construction.

An even further object of the present invention is to provide a new and improved container transport assembly which is susceptible of a low cost of manufacture with regard to both materials and labor, and which accordingly is then susceptible of low prices of sale to the consuming public, thereby making such container transport assemblies economically available to the buying public.

Still yet another object of the present invention is to provide a new and improved container transport assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention mounted to an individual's waist portion.

FIG. 4 is an orthographic view, taken along the lines 4—4 of FIG. 3 in the direction indicated by the arrows.

FIG. 5 is an isometric partial view of the invention indicating the use of a key loop member.

FIG. 6 is an isometric illustration of the invention employing a pocket member.

DESCRIPTION OF THE PREFERRED EMBODIMENT

Figure 1:
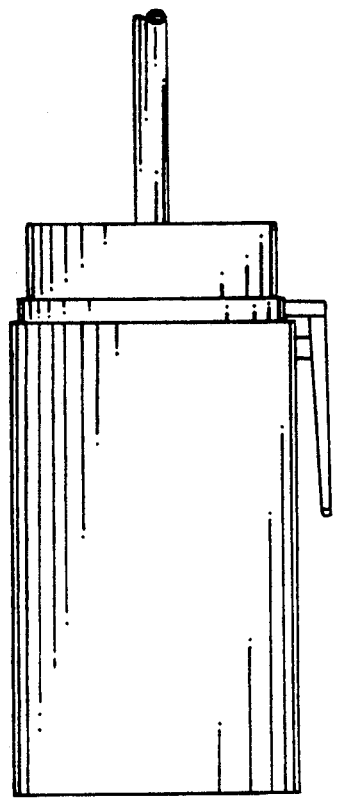
FIG. 1 is an orthographic view of a prior art container structure.
Figure 2:
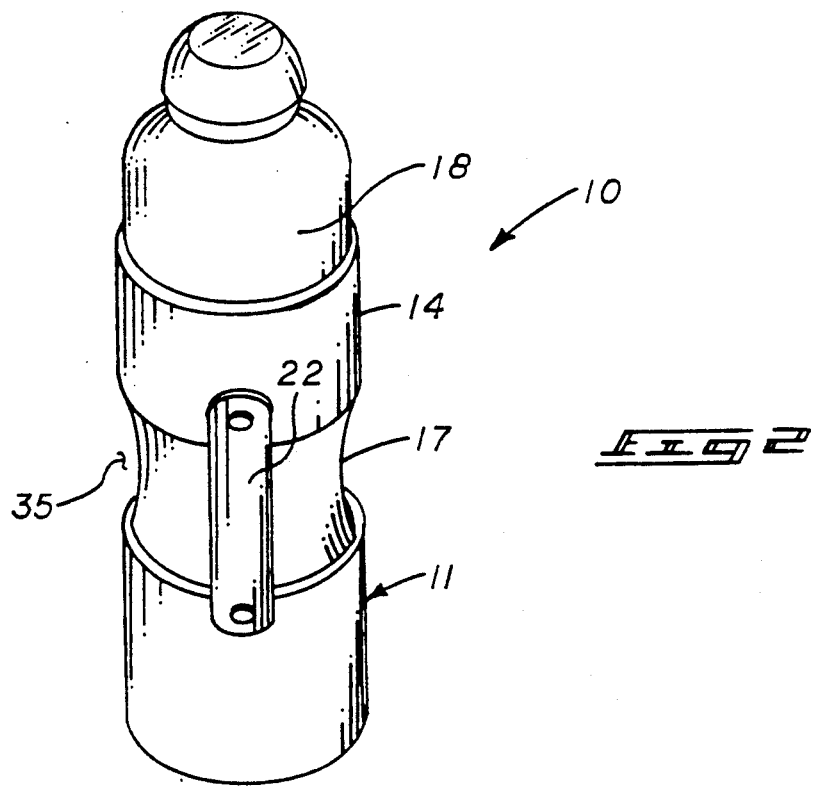
FIG. 2 is an isometric illustration of the invention.

With reference now to the drawings, and in particular to FIGS. 1 to 8 thereof, a new and improved container transport assembly embodying the principles and concepts of the present invention and generally designated by the reference numeral 10 will be described.

FIG. 1 is an orthographic view of a prior art container, having an integral mounting tab, as indicated in U.S. Pat. 4,955,572.

More specifically, the container transport assembly 10 of the instant invention essentially comprises a flexible lower housing 11 having a lower housing cylindrical wall 12 and a lower housing floor 13. A flexible cylindrical upper housing 14 is coaxially aligned with the lower housing 11 about a central axis 23 (see FIG. 4). A container 15 is received within the lower housing, and with the container 15 having a lower cylindrical portion 16 geometrically, complementarily received within the lower housing 11, with the container 15 having a concave container central portion 17 oriented between the lower and upper housings 11 and 14, wherein the upper and lower housings are spaced apart for ease of manual grasping of the central portion 17 for ease of positioning and removal of the container 15 relative to the lower and upper housings 11 and 14 respectively. The container includes a cylindrical container upper portion 18 that is received within the upper housing 14, with the upper portion 14 terminating in a container neck 19 having a cap 20 removably mounted relative to the neck for access to the fluid and contents within a container.

A flexible first and second strap 21 and 22 respectively are arranged parallel relative to one another and mounted on diametrically opposed sides of the gap 35 between the lower and upper housings 11 and 14. The gap 35 is coextensive with the concave container central portion 17. The flexible first and second straps 21 and 22 due to their flexible nature permit ease of insertion and removal of the container by permitting self-alignment of the lower and upper housings as the container is directed therewithin, wherein upon removal of the container, the flexible inter-relationship of the lower and upper housings permits ease of folding and flattening of the transport structure. An outer strap 25 is mounted to the first strap 21 defining a loop 25a to receive a support strap 24 therethrough.

The FIG. 5 indicates the second strap 22 having a second strap loop 26 that in turn pivotally mounts a key ring 27. The key ring 27 includes a reciprocatable leg 28 reciprocatably mounted within a sleeve 29 permitting ease of insertion and removal of keys relative to the key ring 27. Further, a coin pocket 30 is mounted to the lower housing cylindrical wall 12 for accommodating various transport components such as coins, messages, and the like.

Figure 7:
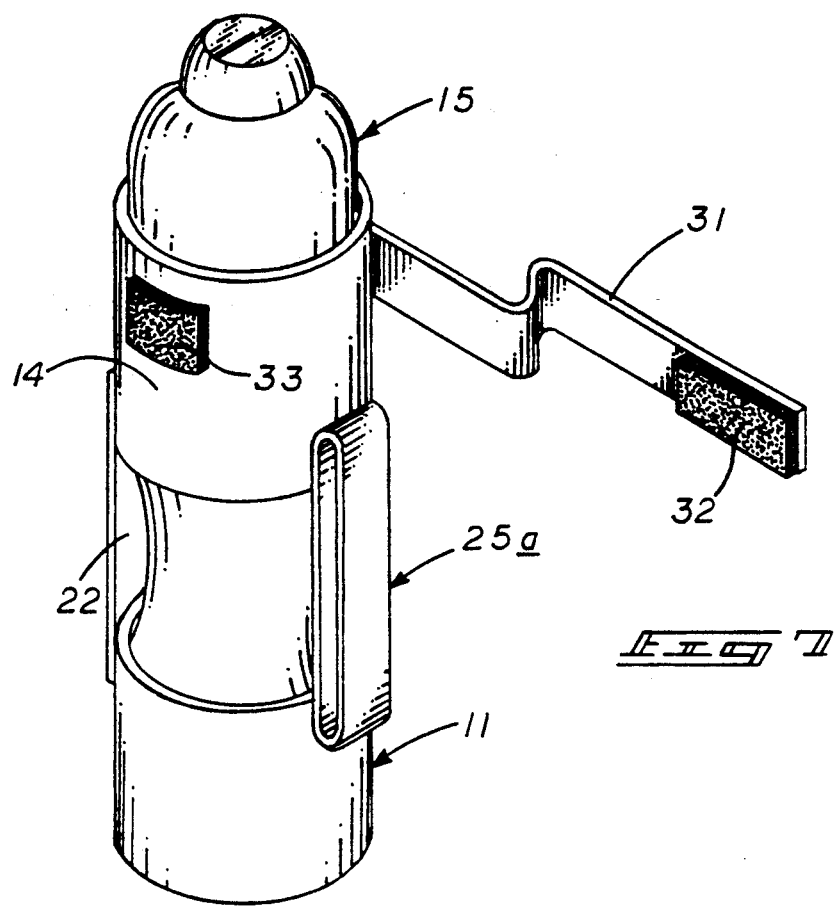
FIG. 7 is an isometric illustration of the invention employing a bicycle securement strap.
Figure 8:
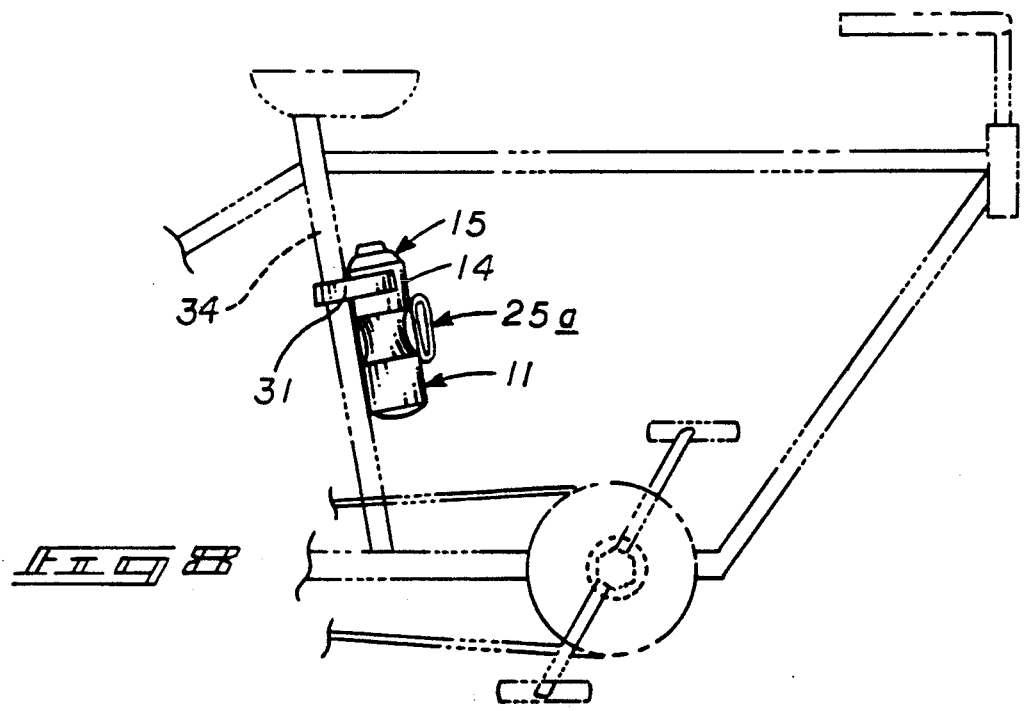
FIG. 8 is an isometric illustration of the securement strap of FIG. 7 mounted to an associated bicycle structure.

The FIGS. 7 and 8 indicates the use of a bicycle strap 31 having one end fixed to the upper housing 14 and a free distal end of the bicycle strap 31 having a first hook and loop fastener patch 32 arranged for selective securement to a second hook and loop fastener patch 33 that is mounted to the upper housing 14 in a spaced relationship relative to the one end of the bicycle strap 31. In this manner, the bicycle strap 31 permits securement about a bicycle frame tube 34, as indicated in FIG. 8.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A container transport assembly, comprising,
    a flexible lower housing, having a lower housing cylindrical wall and a lower housing floor,
    and
    a flexible cylindrical upper housing, having a cylindrical upper housing wall, wherein the upper housing is spaced from the lower housing defining a gap therebetween,
    and
    the lower housing is coaxially aligned with the upper housing about a central axis,
    and
    a flexible first strap is secured to the lower housing cylindrical wall and the upper housing cylindrical wall, and a second strap is secured to the lower housing cylindrical wall and the upper housing cylindrical wall, wherein the first strap and second strap are arranged in a parallel coextensive relationship on diametrically opposed sides of the lower housing and the upper housing,
    and
    a container received within the lower housing and the upper housing,
    and
    the container includes a lower cylindrical portion geometrically, complementarily received within the lower housing, and the container further including a concave container central portion coextensive with the gap, and the container further including a container upper portion extending through the upper housing terminating in a container neck, with the container neck having a removable cap mounted thereto,
    and
    the first strap includes an outer strap, and the outer strap and the first strap define a loop, and a support strap, with the support strap received through the loop.

2. A container transport assembly as set forth in claim 1 wherein the second strap includes a second strap loop and the second strap loop includes a key ring pivotally mounted through the second strap loop, the key ring including a key ring sleeve and a reciprocatable leg mounted to the key ring received within the key ring sleeve permitting access to the key ring for mounting and removing of key members thereon.

3. A container transport assembly as set forth in claim 2 including a coin pocket mounted to an exterior surface of the lower housing cylindrical wall.

4. A container transport assembly as set forth in claim 3 including a bicycle strap having one end pivotally mounted to the upper housing cylindrical wall, and the bicycle strap including a first hook and loop fastener patch mounted to a free distal end of the bicycle strap spaced from the one end, and a second hook and loop fastener patch mounted to the upper housing cylindrical wall for selective securement to the first hook and loop fastener patch permitting mounting the bicycle strap about a bicycle frame tube.

* * * * *